United States Patent
Panotopoulos et al.

(10) Patent No.: US 9,285,544 B2
(45) Date of Patent: Mar. 15, 2016

(54) OPTICAL POWER SPLITTER INCLUDING A ZIG-ZAG

(75) Inventors: Georgios Panotopoulos, Berkeley, CA (US); Michael Renne Ty Tan, Menlo Park, CA (US); Paul Kessler Rosenberg, Sunnyvale, CA (US); Sagi Varghese Mathai, Berkeley, CA (US); Wayne V. Sorin, Mountain View, CA (US); Susant K. Patra, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/347,366

(22) PCT Filed: Sep. 30, 2011

(86) PCT No.: PCT/US2011/054336
§ 371 (c)(1),
(2), (4) Date: Mar. 26, 2014

(87) PCT Pub. No.: WO2013/048457
PCT Pub. Date: Apr. 4, 2013

(65) Prior Publication Data
US 2014/0226934 A1 Aug. 14, 2014

(51) Int. Cl.
*G02B 6/26* (2006.01)
*G02B 6/42* (2006.01)
*G02B 27/12* (2006.01)
(Continued)

(52) U.S. Cl.
CPC .......... *G02B 6/2938* (2013.01); *G02B 6/29367* (2013.01); *G02B 6/4231* (2013.01); *G02B 27/1073* (2013.01); *G02B 27/1006* (2013.01); *G02B 27/106* (2013.01); *G02B 27/145* (2013.01)

(58) Field of Classification Search
CPC ............ G02B 6/29367; G02B 6/2938; G02B 27/106; G02B 27/1006; G02B 27/1073; G02B 6/4231
USPC ........................ 385/47, 48; 359/618, 627, 639
See application file for complete search history.

(56) References Cited

U.S. PATENT DOCUMENTS 4,362,361 A * 12/1982 Campbell et al. ............. 359/629
4,765,715 A    8/1988 Matsudaira et al.
(Continued)

FOREIGN PATENT DOCUMENTS

CN    1640024 A    7/2005
JP    59-022022 A    2/1984
(Continued)

OTHER PUBLICATIONS

Ik-Bu Sohn et al., "Fabrication of Optical Splitter and Passive Alignment Technique with a Femtosecond Laser," IEEE Photonics Technology Letters, Nov. 2005, pp. 2349-2351, vol. 17, Issue 11, IEEE, Available at: <ieeexplore.ieee.org/xpl/freeabs_all.jsp?arnumber=1522316>.
(Continued)

*Primary Examiner* — Robert Tavlykaev
(74) *Attorney, Agent, or Firm* — Hewlett Packard Enterprise Patent Department (57) ABSTRACT

An optical power splitter includes a zig-zag and a reflector element associated with the zig-zag. The zig-zag is to split an input signal based on the reflector element, and output a plurality of split signals.

13 Claims, 7 Drawing Sheets

(51) Int. Cl.
*G02B 6/293* (2006.01)
*G02B 27/10* (2006.01)
*G02B 27/14* (2006.01)

(56) References Cited

U.S. PATENT DOCUMENTS

| | | | |
|---|---|---|---|
| 5,155,778 A | 10/1992 | Magel et al. | |
| 6,094,293 A * | 7/2000 | Yokoyama | G02B 6/3572 359/280 |
| 6,115,178 A * | 9/2000 | Naganuma et al. | 359/485.03 |
| 6,198,864 B1 * | 3/2001 | Lemoff et al. | 385/47 |
| 6,292,298 B1 | 9/2001 | Glance | |
| 6,563,976 B1 * | 5/2003 | Grann | G02B 6/29311 385/24 |
| 6,870,976 B2 * | 3/2005 | Chen et al. | 385/14 |
| 7,068,939 B2 | 6/2006 | Zhao | |
| 7,088,891 B2 | 8/2006 | Jung et al. | |
| 7,260,328 B2 * | 8/2007 | Kropp | 398/82 |
| 8,303,195 B2 * | 11/2012 | Adachi et al. | 385/93 |
| 8,540,437 B2 * | 9/2013 | Lee | G02B 6/4215 385/31 |
| 2002/0131180 A1 * | 9/2002 | Goodman | 359/634 |
| 2003/0161591 A1 * | 8/2003 | Chiang et al. | 385/89 |
| 2004/0067015 A1 * | 4/2004 | Nakajima | 385/33 |
| 2005/0225864 A1 * | 10/2005 | Kornrumpf et al. | 359/619 |
| 2010/0002987 A1 * | 1/2010 | Hata | G02B 6/29365 385/14 |

FOREIGN PATENT DOCUMENTS

| | | |
|---|---|---|
| JP | 2004046096 A | 2/2004 |
| WO | WO-03028262 A1 | 4/2003 |
| WO | WO-2010/145802 A1 | 12/2010 |
| WO | WO-2011115624 A1 | 9/2011 |

OTHER PUBLICATIONS

International Search Report and Written Opinion, International Application No. PCT/US2011/054336, Date of Mailing: May 2, 2012, pp. 1-7.

* cited by examiner

OPTICAL POWER SPLITTER INCLUDING A ZIG-ZAG

BACKGROUND

Communication architectures may involve optical signals and interconnects to broadcast a signal from one node to a multitude of nodes. A splitter may be used to split a signal into a multitude of signals. However, the splitter may be associated with costly materials and manufacturing steps. For example, a splitter may include expensive optical elements, partial reflectors, and fiber terminals that are to be assembled and actively aligned using a complex procedure involving shining a light through the device, detecting its performance, and adjusting the components accordingly.

BRIEF DESCRIPTION OF THE DRAWINGS/FIGURES

The present examples will now be described with reference to the accompanying drawings. In the drawings, like reference numbers may indicate identical or functionally similar elements.

DETAILED DESCRIPTION

An optical splitter may provide multiple output signals based on an input signal. Optical splitters may be based on a zig-zag architecture to reflect and split the input signal, providing a compact design that may achieve very low losses. However, splitters based on zig-zag architectures may be costly to implement, based on components such as optical elements, partial reflectors, and fiber terminals. A reflector element, which may include one or more discrete reflectors, may rely on multiple different production and assembly processes. For example, producing a reflector element may involve seven different reflecting wafers associated with seven different target reflectivity values. Each discrete reflector element may have a large aspect ratio, and may be sensitive to surface variations when laying them flat against a zig-zag slab. A reflector wafer used to produce a reflector element can be subject to stresses, including when applying a dielectric coating at elevated temperatures associated with dicing, and bowing when dicing the wafer into discrete reflectors. Complex alignment for placement and maintaining an alignment position with high accuracy (e.g., to cure a glue holding the reflector element in place) may be associated with significant yield penalties.

However, various techniques may reduce costs associated with implementing zig-zag architectures for optical splitters. For example, a number of reflector elements may be combined, reducing the overall number and minimizing depositions and other fabrication and assembly steps. A reflector element may be monolithically structured, and may use one wafer to further reduce a number of production steps. Thus, device yield may be improved dramatically. Assembly cost and complexity may decrease, associated with assembling a fewer number of discrete reflectors. A reflectivity value may be obtained by deposition of a coating directly onto the zig-zag, in contrast to dicing a discrete reflector element from a wafer. Additional techniques may involve mechanical designs to enable passive alignment assembly, obviating production steps associated with active alignment such as shining a light through a device and using detectors to verify device behavior. Devices may include design tolerances, using appropriate mechanical features, to facilitate passive alignment assembly. Multiple components may be physically combined to fix their orientation relative to each other, thereby avoiding an alignment step for those components.

Figure 1:
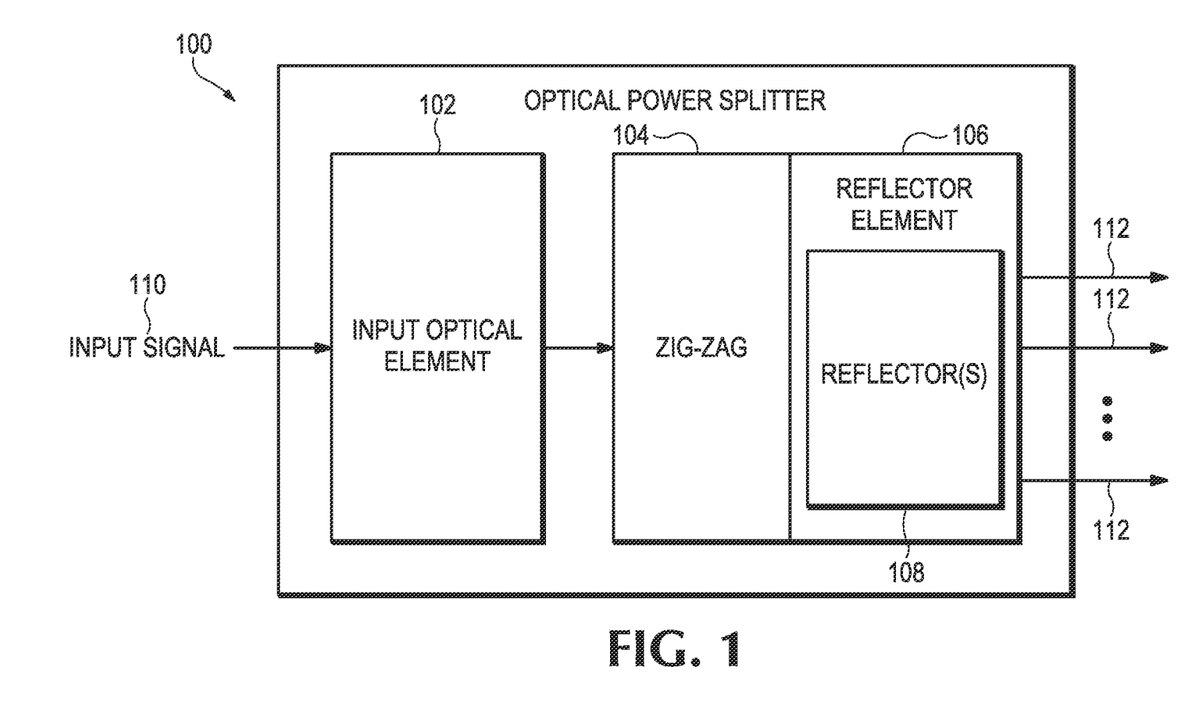
FIG. 1 is a block diagram of an optical power splitter according to an example.

FIG. 1 is a block diagram of an optical power splitter 100 according to an example. The optical power splitter 100 may include an input optical element 102, a zig-zag 104, and a reflector element 106 to receive an input signal 110 and produce a plurality of split signals 112. The reflector element 106 may include at least one reflector 108.

The input optical element 102 may receive input signal 110 from an input fiber (not shown in FIG. 1). The input optical element 102 may optically manipulate the input signal 110. For example, the input optical element 102 may expand the input signal 110 and pass the input signal 110 to the zig-zag 104.

The zig-zag 104 may receive the input signal 110, as processed by the input optical element 102, and produce a plurality of split signals 112. The zig-zag 104 may produce the split signals 112 based on the input signal 110 bouncing back and forth in the zig-zag 104 and splitting off split signals 112 using the reflector element 106.

The optical power splitter 100 may provide benefits that enhance manufacturing/assembly efficiency, reduce device cost/assembly complexity, and increase yield, for example. The reflector element 106 may include a total number of discrete reflectors 108 that is fewer than n−1, where n is the number of split signals 112 produced. The input optical element 102 and the zig-zag 104 may be integrated as a one-piece monolithic input element to fix the orientation of the input optical element relative to the zig-zag. The reflector element 106, including the discrete at least one reflector 108, may be applied to the zig-zag as a reflective coating. Components of the optical power splitter 100 may be structured for passive alignment, such that alignment of the components may occur by assembling the components without a need to verify and adjust orientation by active alignment using a light source to check alignment.

Figure 2:
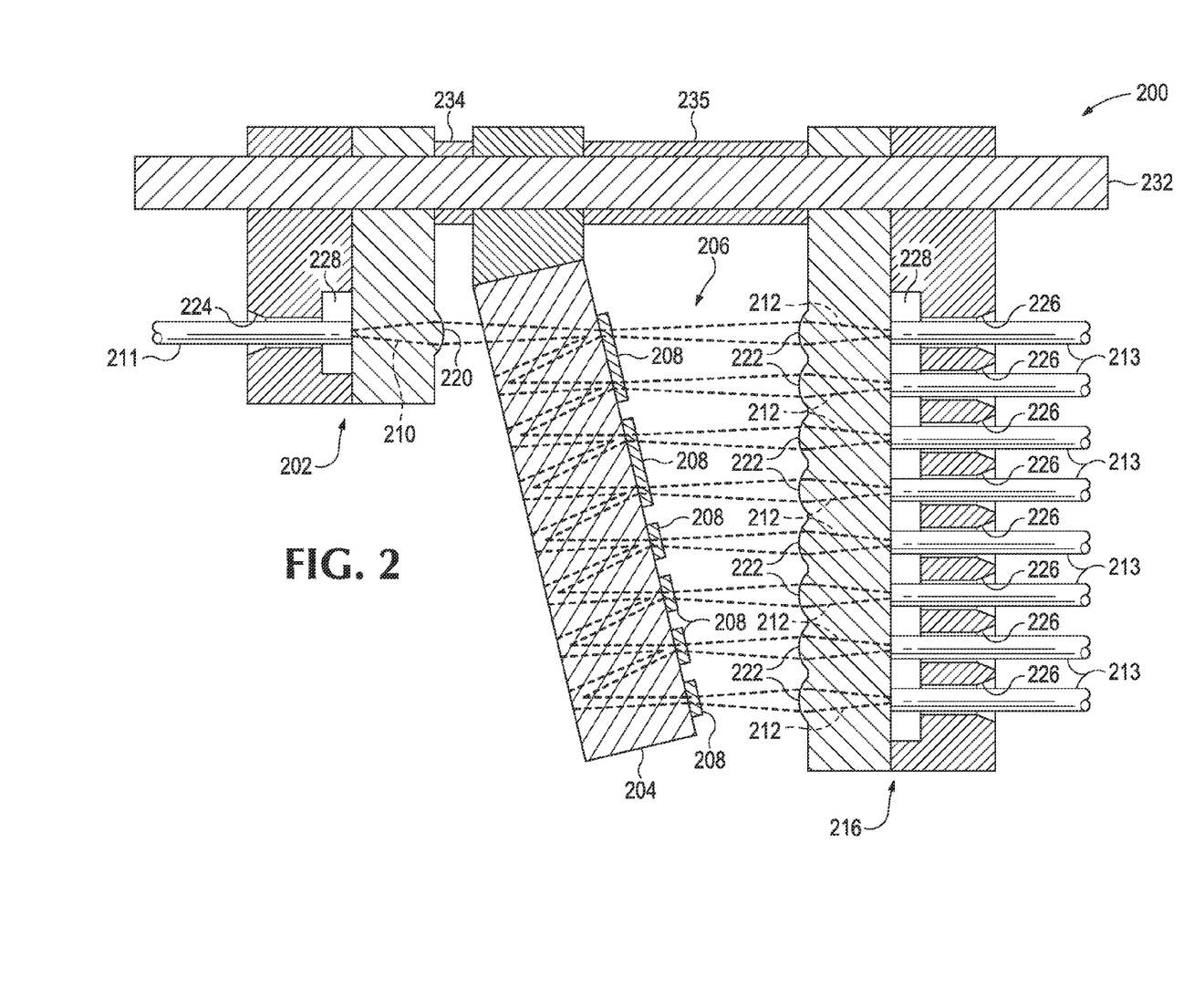
FIG. 2 is a sectional side view of an optical power splitter according to an example.

FIG. 2 is a sectional side view of an optical power splitter 200 according to an example. The optical power splitter 200 may include an input optical element 202 to receive input signal 210 from an input fiber 211, a zig-zag 204 to split the input signal 210 into split signals 212, and an output optical element 216 to couple each of the split signals 212 with a corresponding one of the output fibers 213.

The input optical element 202, zig-zag 204, and output optical element 216 may be assembled together based on snap-together assembly using assembly alignment structures forming a part of each component. Components also may be assembled together based on structural components such as at least one passive alignment mechanical support 232. A component may include a via to accommodate the mechanical support 232. Structural alignment may be based on a first spacer 234, a second spacer 235, and other spacers not shown. Multiple mechanical supports 232 and spacers may be used, including use of an upper mechanical support 232 as shown, and also a lower (or other orientation) mechanical support (not shown) passing through a lower area of the components. Pins and spacers may be used to align elements. For example, pins may be used to mechanically align components along an x-axis and a y-axis, and spacers may be used to mechanically align components along a z-axis. Mechanical support 232 may be keyed to provide rotational alignment about the axis of the mechanical support 232, and multiple mechanical supports 232 may be used to stabilize components. Thus, the components may be passively aligned based on physical interactions with each other that cause the components to align when assembled together, bypassing a need for time consuming orientation and position adjustments of each component.

The input optical element 202 may include an input fiber receptacle 224, glue trench 228, and input lens 220. Other techniques may be used to couple the input fiber 211 to the input optical element 202, such as non-glue-based friction retention, v-grooves, and the like. Input fiber 211 may be a one- or two-dimensional array of fibers, and input fiber receptacles 224 may be spaced from each other to facilitate efficient insertion of multiple input fibers 211. Input fiber 211 may be inserted into the fiber receptacle 224, and fiber receptacles 224 may be spaced from each other with a sufficient pitch to simplify fiber loading, and thus further reduce assembly difficulty/costs. In an example, the pitch associated with spacing of the input fiber receptacles 224 from each other may differ from a pitch associated with a typical multi-fiber connector, such as fixed multi-fiber inputs including mechanical transfer (MT) ferrule connectors associated with multi-fiber ribbon cables, where fibers in the MT ferrule connector are spaced from each other at an industry standard pitch of 250 micrometers. MT terminals may be associated with very high cost due to precise mechanical requirements associated with contact mating. Such costs are exacerbated in the case of multi-row connectors. Thus, cost savings are achieved based on the features of the input optical element 202, by avoiding a need for MT ferrule connectors. Similar savings may be associated with the output optical element 216.

The input optical element 202 may enable the input fiber 211 to be inserted toward input lens 220, and the input fiber 211 may contact input optical element 202. The input fiber 211 may be cleaved and/or include a face that is not flush with the receiving surface of input optical element 202. The input optical element 202 may include a glue trench 228 that may be filled with a glue to secure the input fiber 211 to the input optical element 202. The glue may be used to enhance optical coupling between the input fiber 211 and the input optical element 202, despite any cleaving that may be associated with the input fiber 211. The optical element 202 may be associated with pigtailed components, due to the ability to add a pigtail fiber by inserting it into the input fiber receptacle 224. Optical coupling may be enhanced based on the proximity of the input fiber 211 to the input optical element 202.

The input optical element 202 is shown based on two parts assembled together. However, the input optical element 202 may be formed of a fewer or greater number of parts. Input optical element 202 may be made of glass, using techniques such as gray-scale lithography. In an example, the input lens 220 may be formed separately from the input optical element. In another example, the input optical element 202 may be a single part. The input optical element 202 may be formed by molding or other techniques, for example. A low-cost molded plastic process may be used, saving costs compared to using glass and gray-scale lithography. Molded plastic elements may be designed so that cleaved fibers can be loaded and adhered directly on the optical elements, eliminating the use of costly fiber terminals. Accordingly, input optical element 202 may be mass produced and may include features for efficient assembly. The input optical element 202 may pass the input signal 210 to the zig-zag 204.

The zig-zag 204 may be associated with a reflector element 206, which may include at least one reflector 208. Reflectors 208 may be implemented as monolithic dielectric reflectors, and may be implemented as discrete reflectors. In the illustrated example, the reflector element 206 includes two tall reflectors and four short reflectors, although the lowermost reflector may be omitted. A reflector 208 may be associated with passing a portion of the input signal 210 as a split signal 212, and reflecting a portion of the input signal 210 back into the zig-zag 204. A tall reflector may be associated with multiple split signals 212 and multiple reflections, as shown in FIG. 2. The input signal 210 may bounce back and forth in the zig-zag 204 by reflecting from the reflectors 208, creating a plurality of split signals 212. In the illustrated example, eight split signals 212 are created, using six discrete reflectors 208. Thus, n=8 split signals 212 may be produced using fewer than n−1 (i.e., five) reflectors 208. Each split signal 212 may be an array of multiple split signals (e.g., multiple signals stacked along an axis extending perpendicular to the page of FIG. 2). Using a fewer number of reflectors 208 (e.g., fewer than n−1), including tall/short reflectors each presenting a single reflectivity value for multiple output split signals), may result in unequal power across the split signals (e.g., unequal output tap power, where a tap is associated with a split signal being output). However, because the example zig-zag architectures described herein may provide low-loss power splitting, even the split signal output taps that are lower in output than the other taps will have sufficient optical power to form a reliable optical link. Alignment of the zig-zag 204 may be provided by the mechanical support 232, first spacer 234, and second spacer 235. The split signals 212 from the zig-zag 204 may be passed to the output optical element 216.

The output optical element 216 may include output lenses 222, glue trench 228, and output fiber receptacles 226. The split signals 212 may be received at the output lenses 222, and coupled to the output fibers 213. Although eight output fibers 213 are shown, a greater or fewer number of output fibers 213 may be used, and each output fiber 213 shown may represent an array of multiple output fibers. Similar to the input optical element 202, the output optical element 216 may include glue trench 228 to secure and optically couple the output fibers 213 to the output optical element 216. Similar to the input optical element 202, the output optical element 216 may be formed of a fewer or greater number of parts than the illustrated example, e.g., may be molded as a single unitary piece.

Figures 3A, 3B:
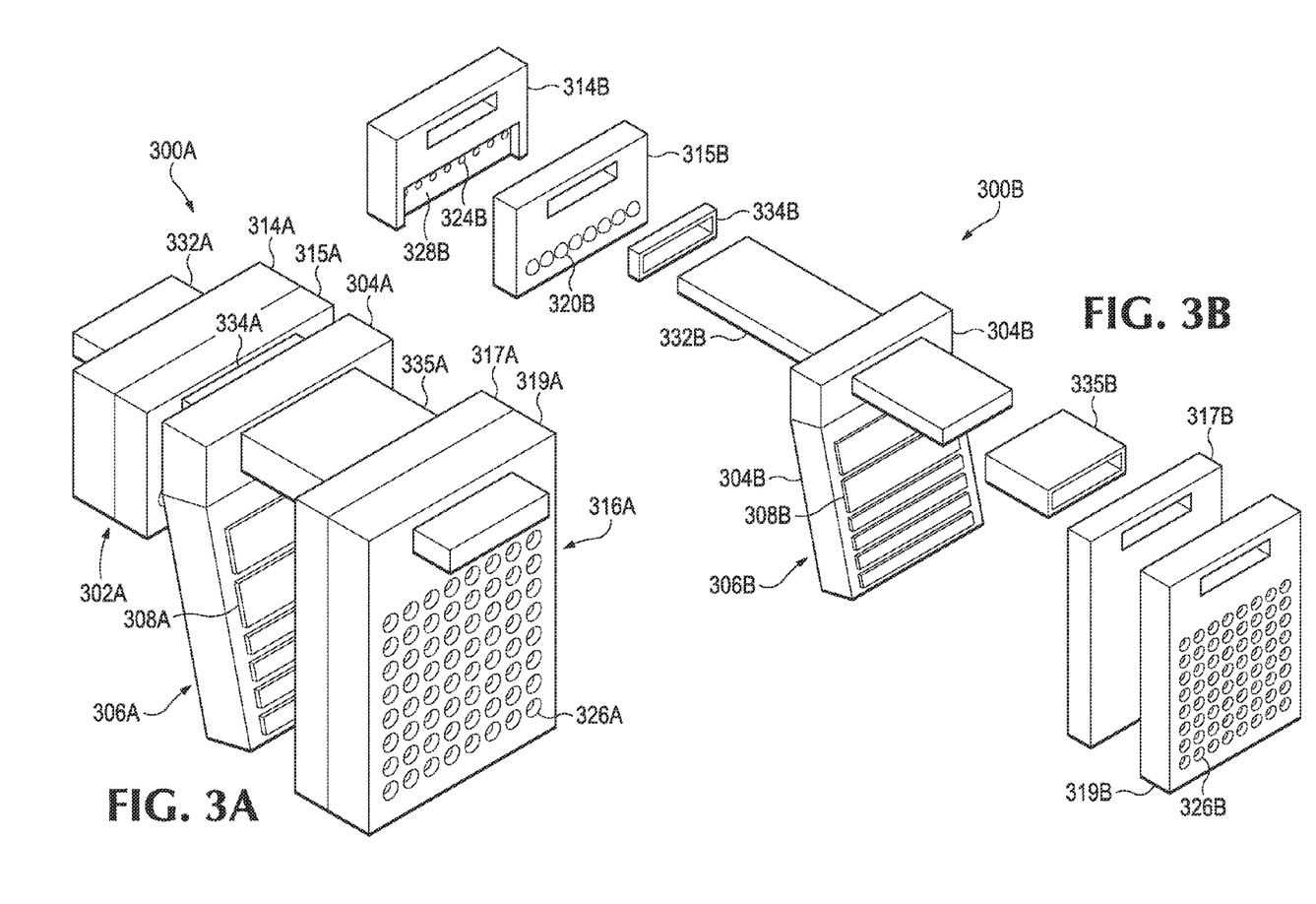
FIG. 3A is a perspective side view of an optical power splitter according to an example.
FIG. 3B is a perspective exploded side view of an optical power splitter according to an example.

FIG. 3A is a perspective side view of an optical power splitter 300A according to an example. The optical power splitter 300A may include an input optical element 302A, zig-zag 304A, and output optical element 316A. Alignment may be provided by mechanical support 332A, first spacer 334A, and second spacer 335A. The input optical element 302A may include an input fiber guide 314A and input lens element 315A. The zig-zag 304A may include a reflector element 306A including one or more reflectors 308A. The output optical element 316A may include an output lens element 317A, an output fiber guide 319A, and a plurality of output fiber receptacles 326A. As illustrated, the output fiber guide 319A may include a two-dimensional array of output fiber receptacles 326A.

FIG. 3B is a perspective exploded side view of an optical power splitter 300B according to an example. Input fiber guide 314B is shown with glue trench 328B and a plurality of input fiber receptacles 324B arranged in a one-dimensional array. Input lens element 315B is shown with a plurality of input lenses 320B arranged in a one-dimensional array. The optical power splitter 300B may include first spacer 334B, mechanical support 332B, zig-zag 304B (including reflector element 306B having at least one reflector 308B), second spacer 335B, output lens element 317B, and output fiber guide 319B that may include a plurality of output fiber receptacles 326B.

The optical power splitters 300A and 300B shown in FIGS. 3A and 3B may enable an input signal (e.g., a plurality of input signals carried on input fibers inserted into the plurality of input fiber receptacles 324B) to be split based on the zig-zag 304A, 304B into a plurality of signals. As illustrated, a one-dimensional input signal array (1×8) is split into a two dimensional output signal array (8×8). In alternate examples, a greater or fewer number of input and/or output signals may be provided by the optical power splitters 300A and 300B.

Figure 4:
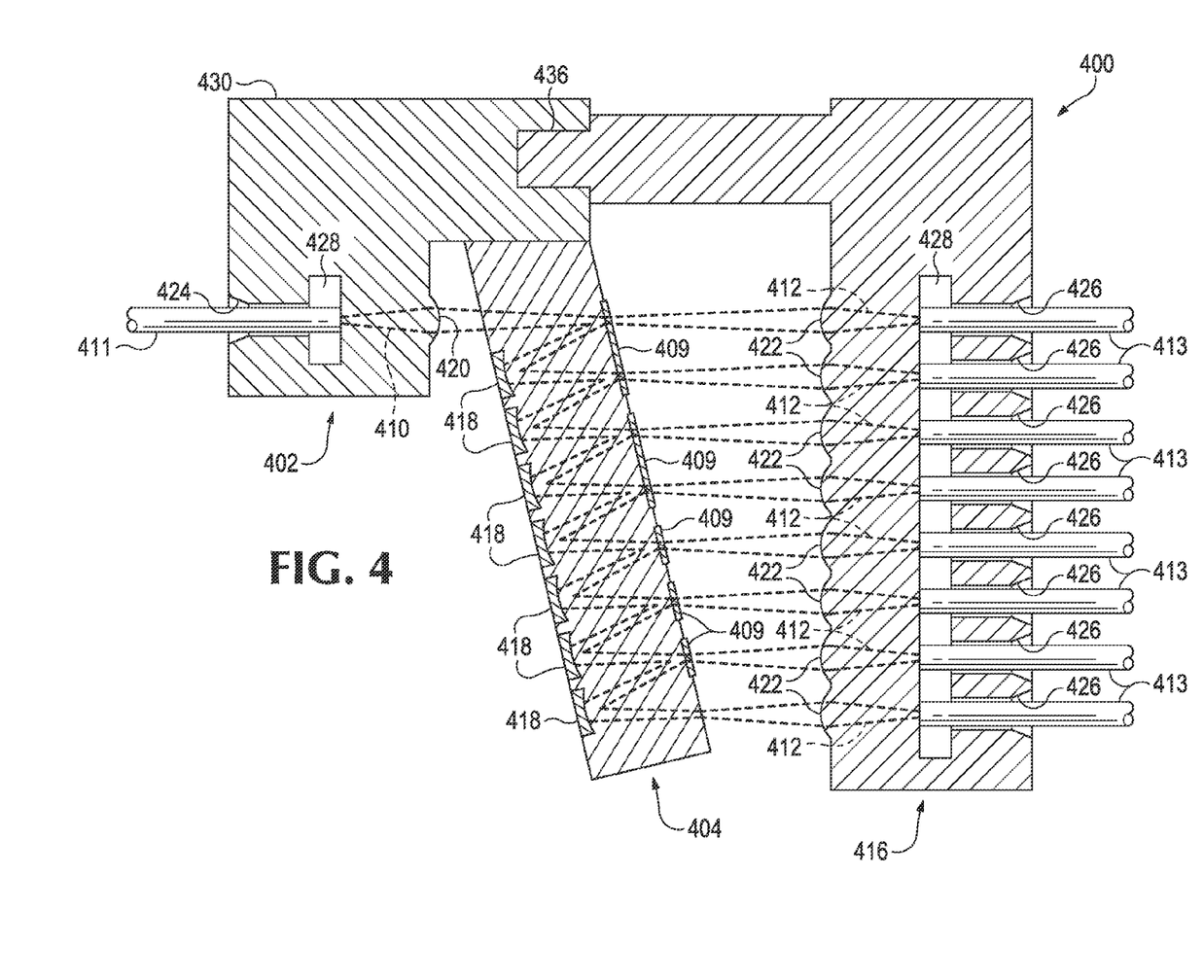
FIG. 4 is a sectional side view of an optical power splitter according to an example.

FIG. 4 is a sectional side view of an optical power splitter 400 according to an example. The optical power splitter 400 may include a monolithic input element 430 and output optical element 416, and may include alignment structures 436 integrated into the structures of the monolithic input element 430 and output optical element 416 (such that a mechanical support that is separate from the components may be omitted). Accordingly, the monolithic input element 430 and output optical element 416 may be passively aligned by snap-together assembly, without a need for active alignment. Furthermore, application of reflectors (and/or reflective coatings) to zig-zag 404 may be facilitated by an application procedure performed on the zig-zag 404 prior to assembly of monolithic input element 430 with output optical element 416, thereby allowing more assembly flexibility. However, in alternate examples, monolithic input element 430 and output optical element 416 may be provided as a single unitary structure. In an example, monolithic input element 430 may be molded of plastic suitable for optical coupling with input fiber 411 and passage of input signal 410.

The zig-zag 404 may be snapped together with the monolithic input element 430. In alternate examples, the zig-zag 404 may be formed as an integral part of monolithic input element 430. Thus, the optical power splitter 400 may be assembled and aligned efficiently based on the number of parts that are to be assembled. Monolithic input element 430 may be molded, such that optical (e.g., input optical element 402) and structural parts are formed as a unitary whole. Furthermore, the input fiber receptacle 424, glue trench 428, and input lens 420 may align the input fiber 411, and its input signal 410, relative to the zig-zag 404, without a need to separately align the input optical element 402 relative to the zig-zag 404.

The zig-zag 404 may split the input signal 410 into a plurality of split signals 412. The zig-zag 404 may use coatings 409 to reflect and/or split the input signal 410 (and may also use discrete reflectors, as in FIG. 2). As illustrated in FIG. 4, five discrete coatings 409 are used to provide eight split signals 412. Each discrete coating 409 is associated with a discrete reflectivity value, and two tall coatings 409 are used to provide multiple optical reflections/splits. Thus, fewer than n−1 reflectors/coatings 409 may be used to create n split signals 412. The input signal 410 may be reflected twice from the first reflective coating 409 to provide the first two split signals 412. Even taller discrete reflectors/coatings 409 may be used to provide additional reflections for the input signal.

In an example, the first reflector/coating 409 may be associated with splitting the first three split signals 412 (not shown in FIG. 4). A single discrete reflector/coating may be used to reflect/split all of the split signals 412 (not shown in FIG. 4). Additional combinations/sizes of reflectors are possible. A reflector/coating may be omitted to produce the lowermost split signal 412.

The zig-zag 404 may include relay mirrors 418, to produce split signals 412. Relay mirrors 418 may be curved, centered at the locations where the beam is incident on the surface of the zig-zag 404. The curvature of the relay mirrors 418 may be selected so that, in combination with the flat exit face (right side) of the zig-zag 404, an effect may be created similar to a half symmetric resonator or hemispherical resonator, which may be equivalent to a folded confocal resonator. Thus, any individual misalignment associated with a discrete reflector/coating 409 is inhibited from being propagated throughout the zig-zag 404. Such resonator structures/effects may provide high misalignment tolerances to the zig-zag 404.

The split signals 412 may be received at the output optical element 416, and coupled to the output fibers 413 via the output lenses 422, glue trench 428, and output fiber receptacles 426. The output optical element 416 may be passively aligned with the monolithic input element 430 based on the alignment structures 436 that may be formed as part of the monolithic input element 430 output optical element 416. Similar to the monolithic input element 430, the output optical element 416 may be formed (e.g., molded of plastic) as a single unitary piece including output lenses 422, and may include alternate techniques of coupling the output fibers 413. Alternate examples of output optical element 416 may be formed of a greater number of separate pieces. Alternate examples may also use one or more mechanical supports and/or spacers for mechanical alignment.

Figure 5:
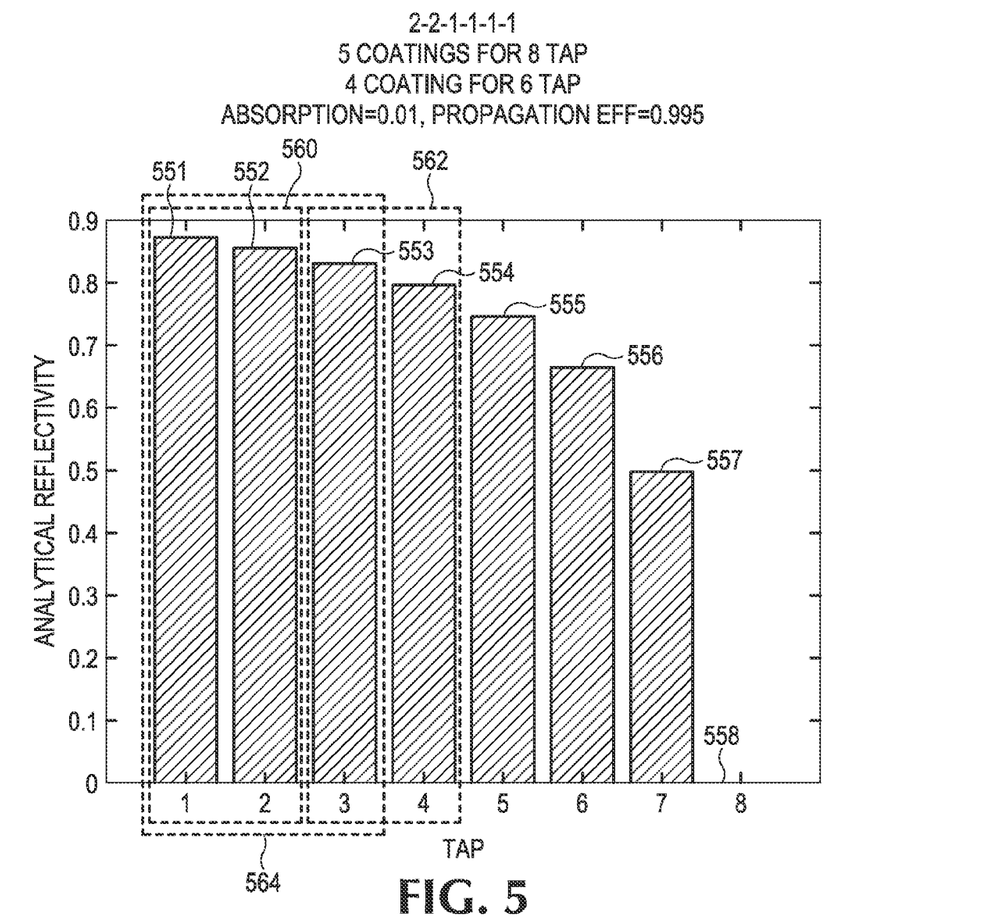
FIG. 5 is a chart based on reflectivity associated with taps of an optical power splitter according to an example.

FIG. 5 is a chart based on reflectivity associated with taps of an optical power splitter according to an example. Taps may be used to obtain output from an optical power splitter, and may be associated with each of the split signals produced from an input signal. FIG. 5 illustrates an example where eight split signals are provided at eight taps, using reflectors/reflective coatings to achieve a desired analytical reflectivity to equalize tap power across all taps (i.e., the split signals are equal in power to each other). In alternate examples, other combinations of taps and reflectors/coatings may be used, such as using one reflector/coating to provide four taps. The optimized values may be obtained based on the following function, for example:

$$R_{n-1} = \frac{1-A}{(1-A-R_n)H+1}$$

Where n is the number of taps, A is the absorption value of the relay mirrors, which may be chosen such that A=0.01 (and may be zero ideally), and H is the transfer efficiency in the zig-zag per tap, which may be chosen such that H=0.985 (and may be 1 ideally).

Each tap may have a different reflectivity associated with it. Tap 1 551 may have the highest reflectivity, and reflectivity may drop off with tap 2 552, tap 3 553, tap 4 554, tap 5 555, tap 6 556, tap 7 557, and tap 8 558. Effectively, tap 8 may not be associated with a reflector/coating, because its reflectivity may be zero.

Because the reflectivity values shown in FIG. 5 represent the optimized ideal for equal tap power across all eight taps, unequal tap power may be obtained by deviating from the reflectivity values shown in FIG. 5. The dashed-line boxes in FIG. 5 illustrate an example of how the tap reflectivity may be altered across the taps. The first dashed box 560 surrounding tap 1 551 and tap 2 552 indicates that one reflector may be used to provide a reflectivity value to tap 1 551 and tap 2 552. Such a scenario is illustrated in FIG. 4, where one tall coating 409 (associated with one reflectivity value) is used to provide the first two split signals 412. Thus, the reflectivity value for that tall first coating 409 may be chosen to optimize tap power across both tap 1 551 and tap 2 552. In an example, the reflectivity value for the first coating may be chosen between the analytical reflectivity for tap 1 551 and tap 2 552. The second dashed box 562 surrounding tap 3 553 and tap 4 554 indicates that one reflector may provide a reflectivity value for tap 3 553 and tap 4 554 (as shown in FIG. 4, where one tall coating 409 is used to provide the third and fourth split signals 412). The third dashed box 564 enclosing tap 1 551, tap 2 552, and tap 3 553 indicates that one reflector may provide an associated reflectivity value for tap 1 551, tap 2 552, and tap 3 553. Additional combinations of taps are possible, including using a single reflector/coating and associated reflectivity for every tap (and/or for taps 1-7, leaving tap 8 blank). Thus, a reflectivity value for a combined/tall reflector/coating may be derived based on the ideal analytical reflectivity values associated with the taps to be combined. For example, a reflectivity value associated with the taps to be combined may be derived by averaging the analytical reflectivities associated with those taps for an ideal case based on individual optimized reflectivity values for each tap. Other techniques may be used to derive combined reflectivity values, including merit functions, standard deviations of output/input power for every tap, maximum/minimum functions, monte carlo simulations, and other techniques.

Figure 6:
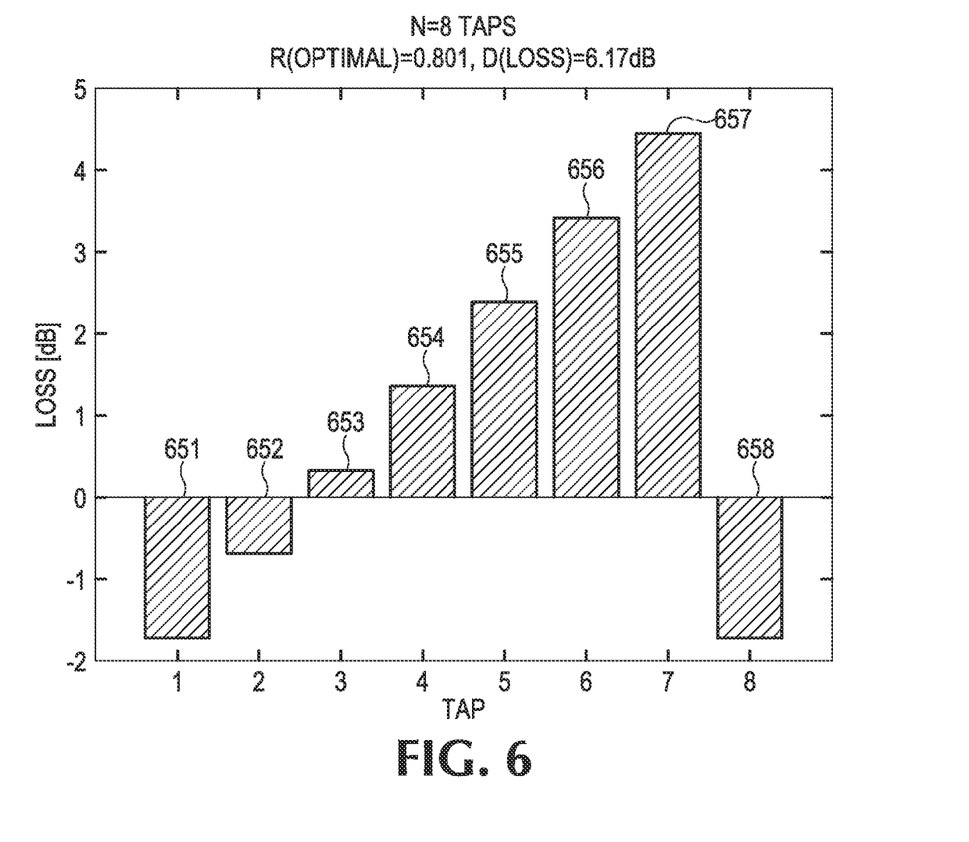
FIG. 6 is a chart based on loss deviation associated with taps of an optical power splitter according to an example.

FIG. 6 is a chart based on loss deviation associated with taps of an optical power splitter according to an example. FIG. 6 may represent an example associated with using one coating/reflector/reflectivity value to generate a signal for tap 1 651, tap 2 652, tap 3 653, tap 4 654, tap 5 655, tap 6 656, and tap 7 657 (with tap 8 left blank). Accordingly, FIG. 6 shows each tap's deviation from an ideal where tap power would have been equal across all taps. The reflectivity value for the one reflectivity value associated with taps 1-7 has been optimized to equalize the power across the taps, and is illustrated as R(OPTIMAL)=0.801. The illustrated loss arises for each tap when using a reflectivity of 0.801 across taps 1-7, because the ideal reflectivity for each tap may differ from a reflectivity of 0.801 (see, e.g., FIG. 5). Accordingly, losses at each tap may be reduced by increasing the number of discrete reflectivity values available, adjusting reflectivity of each tap, which may be associated with the use of additional discrete/separate coatings/reflectors to provide other reflectivity values. In alternate examples, multiple different combinations of taps may be used, such as combining the first four taps and the next three taps; combining the first two taps, the next two taps, and the following two taps; and so on. The use of a single reflectivity value, by combining taps 1-7 (and leaving tap 8 blank), may enable large production savings by avoiding a need for separate reflectors/coatings for each tap, and providing efficient assembly associated with placing a single reflector/coating on a zig-zag. Total power loss across all taps, associated with use of one reflectivity value, may be mitigated by using additional reflectivity values that may be associated with separate discrete reflectors/coatings.

Figure 7:
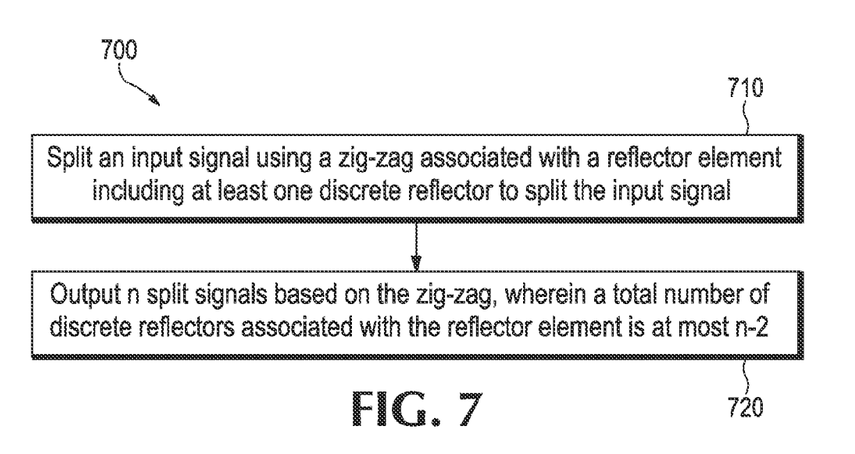
FIG. 7 is a flow chart based on a method of splitting an input signal according to an example.

FIG. 7 is a flow chart 700 based on a method of splitting an input signal according to an example. In block 710, an input signal is split using a zig-zag associated with a reflector element including at least one discrete reflector to split the input signal. The reflector element may be a monolithic structure connected to the zig-zag, and may be formed as at least one coating applied to the zig-zag. In block 720, n split signals are output based on the zig-zag, wherein a total number of discrete reflectors associated with the reflector element is at most n−2. For example, the reflector element may produce n split signals based on a total of one discrete reflector, and may produce the n split signals based on fewer than n−1 total discrete reflectors.

The breadth and scope of the present invention should not be limited by any of the above-described examples, but should be defined in accordance with the following claims and their equivalents.

What is claimed is:

1. An optical power splitter comprising:
   an input optical element to receive an input signal from an input fiber, wherein the input fiber is to contact the input optical element such that the input signal is received from the input fiber without traversing a gap;
   a zig-zag to receive the input signal after traversing a gap between the input optical element and the zig-zag, wherein the zig-zag is to split the input signal and output n split signals;
   a reflector element associated with the zig-zag to split the input signal, wherein the reflector element includes at least one discrete reflector, such that a total number of discrete reflectors associated with the reflector element is at most n−2;
   an output optical element to couple each of the n split signals with a corresponding one of n output fibers; and
   a passive alignment mechanical support to pass through a contiguous end portion of each of the input optical element, the zig-zag, and the output optical element to passively align and support the input optical element, the zig-zag, and the output optical element relative to each other via the respective contiguous end portion of each such that remaining portions of each are not in direct contact with the mechanical support, wherein the input optical element and output optical element are aligned parallel to each other and perpendicular to a path of the input signal by being extended perpendicularly from the respective contiguous end portions and away from the mechanical support, and the zig-zag is aligned obliquely to the path of the input signal and to the input and output optical elements by being extended obliquely from the respective contiguous end portion and away from the mechanical support.

2. The optical power splitter of claim 1, wherein the input optical element and zig-zag are integrated as a one-piece monolithic input element to fix an orientation of the input optical element relative to the zig-zag.

3. The optical power splitter of claim 1, wherein the input optical element, the zig-zag, and the output optical element each include an assembly alignment structure such that the input optical element, the zig-zag, and the output optical element are configured to be snapped together into passive alignment with each other.

4. An optical power splitter comprising:
   an input optical element to receive an input signal from an input fiber, wherein the input fiber is to contact the input optical element such that the input signal is received from the input fiber without traversing a gap; and
   a zig-zag to receive the input signal after traversing a gap, and split the input signal and output a plurality of split signals based on a reflector element,
   wherein the input optical element and zig-zag are integrated as a one-piece monolithic input element to fix an orientation of the input optical element relative to the zig-zag by directly supporting a contiguous end portion of the zig-zag such that remaining portions of the zig-zag are not in direct contact with the input optical element, the zig-zag extending obliquely from the contiguous end portion directly supported by the input optical element; and wherein the input optical element includes an input lens to allow the input signal to exit from the input optical element, traverse a gap, and enter the zig-zag.

5. The optical power splitter of claim 4, wherein the reflector element comprises at least one coating on the zig-zag.

6. The optical power splitter of claim 4, wherein the reflector element is associated with at least one reflectivity value such that the plurality of split signals are not equal in power.

7. The optical power splitter of claim 4, wherein the zig-zag includes at least one relay mirror to output the plurality of split signals.

8. The optical power splitter of claim 4, further comprising an output optical element to couple each of the plurality of split signals with a corresponding one of a plurality of output fibers, wherein at least one of the input optical element and the output optical element is formed of molded plastic, and wherein the input optical element and output optical element are aligned parallel to each other and perpendicular to a path of the input signal, and the zig-zag is aligned obliquely to the path of the input signal and to the input and output optical elements.

9. A method comprising:
passing an input signal from an input lens of an input optical element, across a gap, to enter a zig-zag, wherein the input signal is received from an input fiber that is to contact the input optical element such that the input signal is received from the input fiber without traversing a gap, and wherein a contiguous end portion of the zig-zag, toward where the input signal is received, is directly supported to align the zig-zag obliquely to a path of the input signal, without other portions of the zig-zag being directly supported;

splitting an input signal using the zig-zag associated with a reflector element including at least one discrete reflector to split the input signal; and outputting n split signals based on the zig-zag, wherein a total number of discrete reflectors associated with the reflector element is at most n−2.

10. The method of claim 9, further comprising coupling the input fiber to the input optical element to transmit the input signal from the input fiber to the zig-zag based on an input lens element associated with the input optical element.

11. The method of claim 9, further comprising splitting the input signal into four split signals based on a total of one reflector associated with one reflectivity value.

12. The method of claim 9, wherein the input signal is to be provided by a one-dimensional array of input fibers, and wherein each of the n split signals is to be provided as a one-dimensional array of output fibers.

13. The method of claim 9, further comprising coupling a plurality of output fibers to an output optical element to transmit the n split signals from the zig-zag based on an output lens element associated with the output optical element, wherein the input optical element and output optical element are aligned parallel to each other and perpendicular to a path of the input signal, and the zig-zag is aligned obliquely to the path of the input signal and to the input and output optical elements.

* * * * *